United States Patent [19]

Simon

[11] Patent Number: 5,110,097
[45] Date of Patent: May 5, 1992

[54] ELASTIC MOUNTING, PARTICULARLY FOR A VEHICLE ENGINE

[75] Inventor: Jean-Michel Simon, Clamart, France

[73] Assignee: Hutchinson S.A., France

[21] Appl. No.: 581,930

[22] Filed: Sep. 13, 1990

[30] Foreign Application Priority Data

Sep. 13, 1989 [FR] France ................... 89 11969

[51] Int. Cl.$^5$ ............................... F16F 7/00
[52] U.S. Cl. .................. 267/136; 267/141.1; 267/152
[58] Field of Search ............... 267/136, 141, 152, 153, 267/30, 141.1, 141.2, 141.3, 141.5

[56] References Cited

U.S. PATENT DOCUMENTS

| | | | |
|---|---|---|---|
| 3,504,905 | 4/1970 | Irwin | 267/152 X |
| 3,730,509 | 5/1973 | Jorn | 267/152 |
| 3,873,077 | 3/1975 | Jorn | 267/152 |
| 4,105,266 | 8/1978 | Finney | 267/152 X |
| 4,830,347 | 5/1989 | Langshaw | 267/141 |
| 4,930,758 | 6/1990 | Poirier | 267/153 X |

FOREIGN PATENT DOCUMENTS

| | | |
|---|---|---|
| 0075807 | 4/1983 | European Pat. Off. . |
| 2603995 | 8/1977 | Fed. Rep. of Germany . |
| 0312448 | 4/1989 | France ............. 267/141.1 |
| 45544 | 4/1964 | Luxembourg . |

Primary Examiner—Matthew C. Graham
Attorney, Agent, or Firm—Larson and Taylor

[57] ABSTRACT

Such a mount comprises a set of thin parallel and spaced plates, of flexible material, extending generally transversely to the vertical direction, the ends of these plates being supported on the one hand on a first armature, fastened to the structure of the vehicle, on the other hand, on a second armature fastened to the engine, through superposed blocks of elastic material, intercalated sandwich-style in said ends of the plates, these blocks embedding the ends of the plates without rigid fastening with the respective armatures. In this way, a great vertical flexibility and a high stiffness in the horizontal directions is obtained.

9 Claims, 4 Drawing Sheets

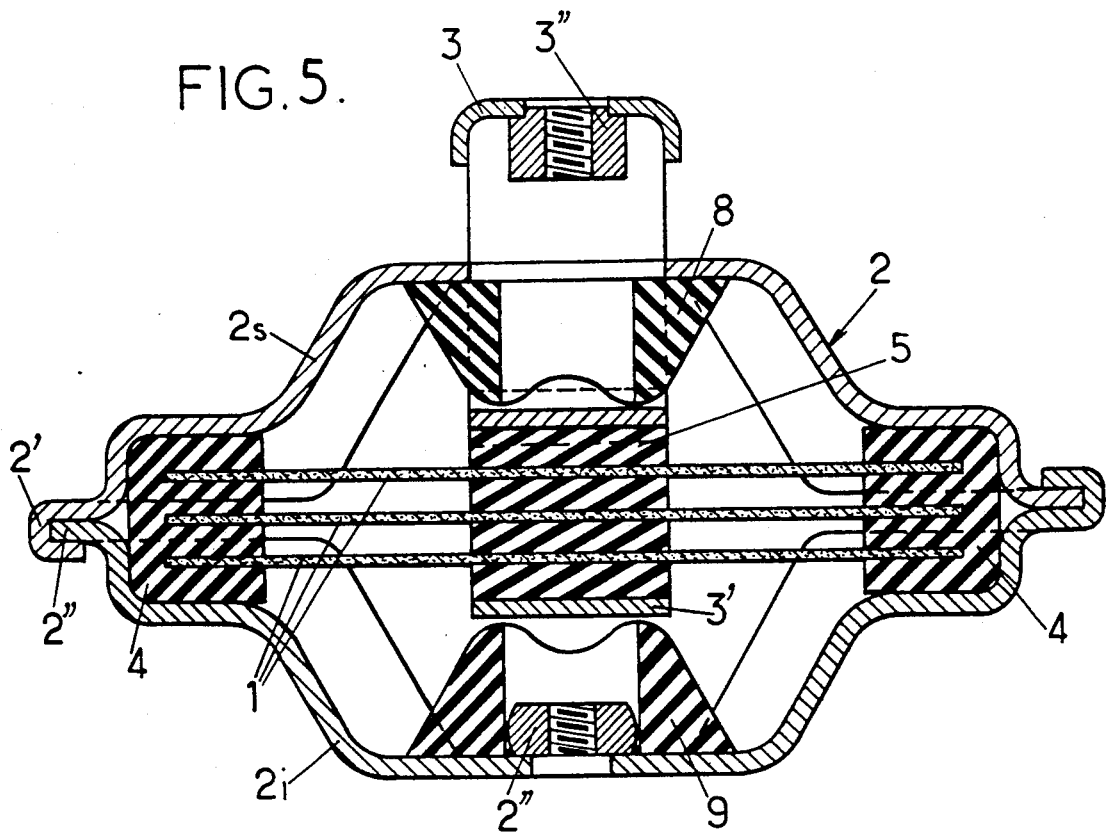
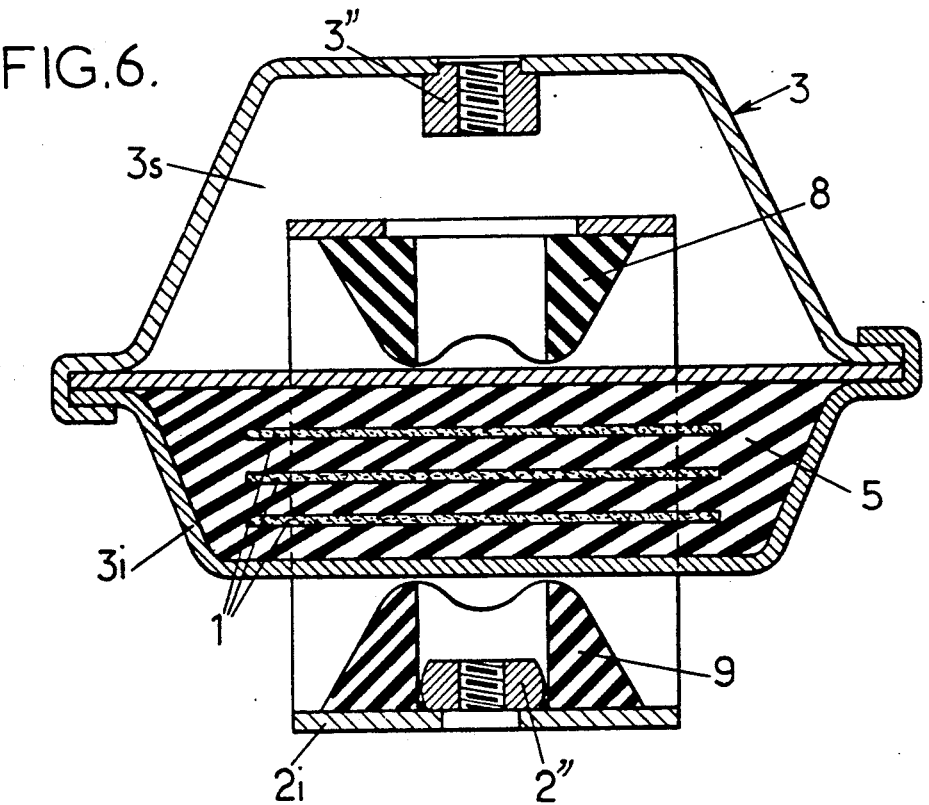

ELASTIC MOUNTING, PARTICULARLY FOR A VEHICLE ENGINE

The present invention relates to an elastic mounting, particularly for a vehicle engine, of the type comprising a first armature adapted to be fixed to the structure of the vehicle, a second armature adapted to be fixed to the engine to support it, and between these two armatures an elastic system having relatively weak rigidity at z, namely in the vertical direction, and greater rigidities—which can be different from one another—in the two transverse directions x and y constituting with the preceding one an orthonormal system.

Elastic mountings of this type are already known, for example those which are constituted by a tube of composite material of horizontal axis, and which have excellent behavior under vertical loads, namely a weak stiffness in this direction (z), and very low creep.

However, experience has shown that such springs do not always show sufficient rigidity with respect to transverse forces, that is to say those which are exerted in the horizontal plane (x-y), which is a distinct drawback when such mountings are used to support a vehicle engine-drive unit.

The essential object of the present invention is to overcome this drawback, whilst preserving the desired elastic properties in the vertical direction, for the acoustic insulation of engines.

Accordingly, an elastic mounting of the general type defined in the introduction will be, according to the invention, essentially characterized in that said elastic system comprises a set of parallel and spaced thin plates, of flexible material, extending generally transversely to said vertical direction, the ends of these plates being supported on the one hand on said first armature, on the other hand on the second, through superposed blocks of elastic material, inserted as a sandwich in said ends of the plates, these units embedding the ends of the plates without rigid fastening with the respective armatures.

On account of the absence of any rigid fastening such as screw-nut, the lateral transmission of vibrations, through the plates, between the two armatures, namely, in the use contemplated, from the engine to the vehicle, is effectively avoided.

According to a complementary feature of the present invention, the embedded coupling between the ends of the plates and the respective armatures is ensured through a part of said armatures, which envelope said ends at the top, at the bottom, and preferably also at the sides.

This arrangement ensures excellent subjugation of the ends of the plates to the armatures, without risk of detachment of the elastic material, with an excellent continuity of the fibers.

In their simplest form, these plates could be flat, round or square, but will preferably be rectangular or substantially rectangular.

However these plates could also be slightly bulged, their convexity being directed upwards to compensate the static load.

As for the material suitable for consituting them, advantageously composite materials will be selected, namely synthetic resin (epoxy, polyether, etc.), reinforced with strong fibers (glass, carbon, etc.) preferably oriented, and this principally along the large dimension (x) of plates.

The proportion of fibers may be about 40% with respect to the total weight of the plates.

It is seen in any case that these plates will operate essentially in flexion under the effect of the static and dynamic loads of the engine and, being sufficiently thin (thickness of z of the order of for example 2 mm), they could be of very slight stiffness, that is to say great flexibility, in this direction. For a vehicle engine, the overall stiffness of the plates could be of the order of 150 N/mm.

It will be understood that the stiffnesses at x and at y could both be much stronger than at z, due to the fact of the general horizontal orientation of the plates. It will however be convenient to arrange for the blocks of elastic material which support them at their ends and which work in shear in the horizontal plane, to be themselves very stiff in this plane, whilst having preferably a shock-absorbing effect.

In addition, the invention will enable the inherent physical properties of the composite materials of the above-mentioned types, to be preserved, namely excellent behavior with respect to creep, corrosion and fatigue.

The invention also comprises various features concerning the buffers which it is useful to provide to limit on each side the vertical displacement of the plates.

These features, as well as those which have already been explained, will be better seen on reading the following description of several non-limiting examples, of embodiments of elastic support mountings according to the invention.

Reference will be made to the accompanying drawing in which:

FIG. 5 is an axial sectional view, in the plane z o x, of another embodiment of an elastic mounting according to the invention;

FIG. 6 is a transverse sectional view, in the plane z o y, of the same mounting;

In the various figures, the same reference numerals have been used to denote the same parts of the mounting, or parts which are similar or play the same role.

The reference 1 denotes the parallel and spaced thin plates of flexible composite material, which ensure, in the vertical direction, the great flexibility desired for the mounting. In all the figures the number of these plates is three, but it can of course be different, particularly as a function of the weight of the engine which it is intended to support.

The reference 2 denotes the first armature, adapted to be fixed to the structure of the vehicle.

The references 3—3' denote the second armature adapted to be fixed to the engine to support it.

Reference 4 denotes blocks of elastic material (elastomer, superposed, intercalated sandwich-style in the ends of the plates that they embed, which are flexibly fastened to the armature 2, these blocks being fixed to the plates and to this armature.

The reference 5 denotes the same type of block, fixed in the same manner between the opposite ends of the plates and the armature 3—3'.

The particularities of the different embodiments, especially as regards the arrangement of the buffers, are now the following.

Figure 1:
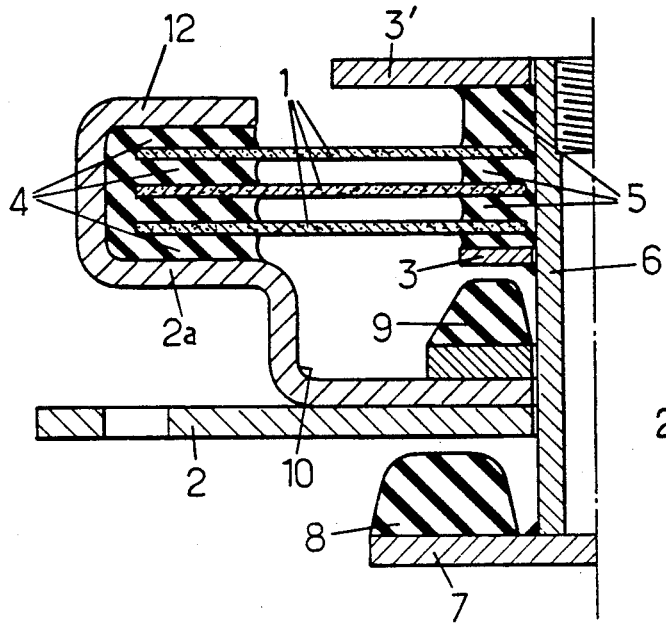
FIG. 1 is an axial half-sectional view in the plane z o x, of a mounting according to the invention, the first armature possessing an enveloping flanged portion for rigidifying and embedding the plates.
Figure 4:
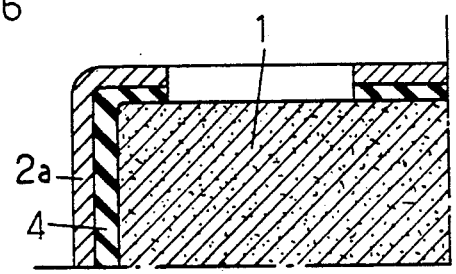
FIG. 4 is a partial horizontal sectional view in the plane x o y, of the same mounting, along the line IV—IV of FIG. 2.

In the embodiment of FIG. 1, it is seen that the armature 3—3' is traversed axially by an anchoring part 6 serving as a support for the blocks 5 as well as for a lower cup 7 supporting a buffer of elastomer possibly shock absorbing 8. This is a so-called "traction" buffer, since it serves to limit the upward vertical displacements of the engine.

A similar compression buffer is shown at 9. By serving as a stop for the portion 3 of the armature fastened to the engine it will limit the vertical displacements of the latter downwards. To permit these displacements a certain amplitude, the buffer 9 is arranged in a sunken portion 10 of the armature 2a fixed to the armature 2.

This other armature 2a comprises an enveloping peripheral flange 12, in which the ends of the plates 1 are embedded, with the interposition of elastomer blocks 4. This arrangement ensures great rigidity in the direction of the axis x, without spoiling the flexibility of the mount in a vertical direction. Folds (not shown) at the ends of flange 12 also enable the rigidity in the direction of the axis y to be increased.

Figure 2:
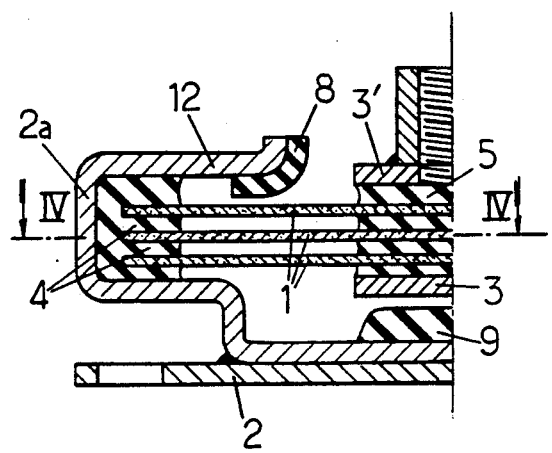
FIG. 2 shows, also in partial section z o x, a modification which this flange bears one of the buffers.

In the embodiment of FIG. 2, there is shown the possibility of establishing the traction buffer 8 on the flange 12 of the armature 2a, which avoids the cross axle 6 of the embodiment of FIG. 1 and the weakening of the plates 1 of composite material by perforation.

Figure 3:
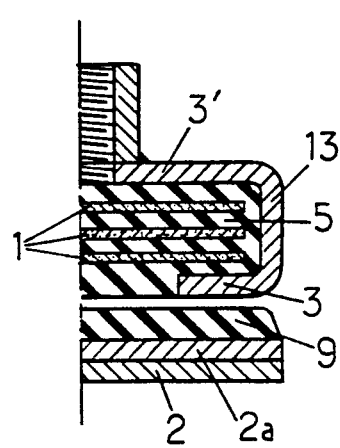
FIG. 3 is a sectional view, in the plane z o y, of the mounting of FIG. 2.

In this case, as shown in FIG. 3, the fastening of the engine to the mount is produced by means of a enveloping sheet metal 13, without a travesing axle.

There is shown in addition, in FIGS. 2 and 3 a compression buffer 9 adapted to cooperate with the portion 3 of the armature 13, fast to the engine.

In the embodiment of FIGS. 5 and 6, the first armature 2 designed to be fixed to the structure of the vehicle is constituted by two half shells of folded sheet metal, the upper one 2s and the lower one 2i, crimped to one another at their edges 2' and 2". These edges thus grip between them, during crimping, the blocks of elastomer 4 for anchoring the ends of the flexible plates 1, of which the assembly is manufactured separately.

As for the second armature 3 for fastening to the engine, it is constituted also by two half shells of folded sheet metal, 3s and 3i crimped through their edges and skirting the armature 2; during the crimping, the closed lower half shell 3i compresses the central elastomeric mass 5, thus permitting the fastening with the central portion of the plates 1. In FIGS. 5 and 6, there is also shown, at 2" and 3", welded nuts, respectively on the half shells 2i and 3s, to permit the fastenings with the structure of the vehicle on the one hand, and the engine on the otherhand.

The armature 2 comprises in addition internally, on each side of the closed half shell 3i buffers of elastomer 8 and 9 adapted to limit the vertical movement, in both directions, of the armature 3 with respect to the armature 2.

Thus an extremely simple and economic embodiment is obtained, having overall the same functions as the other embodiments already described.

Figure 7:
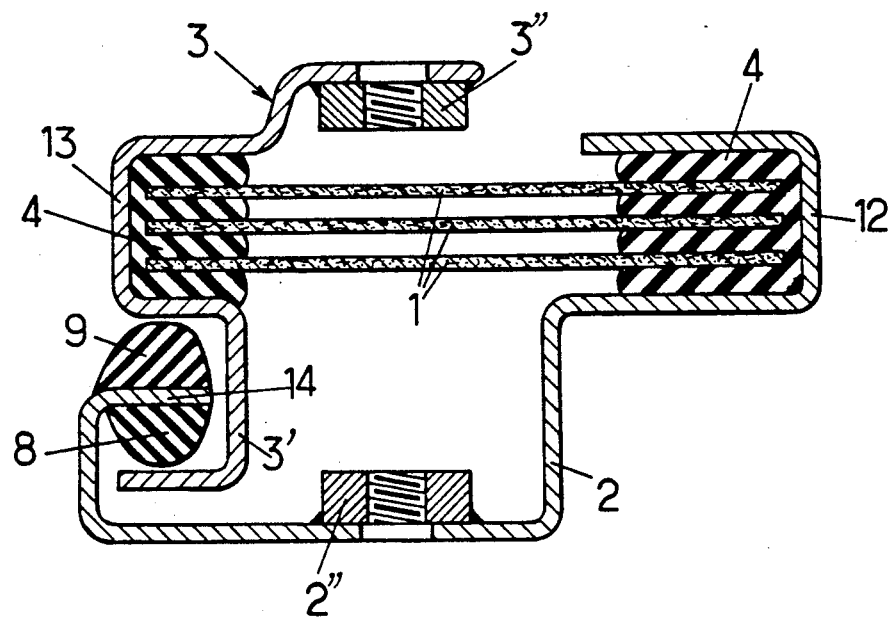
FIG. 7 is a view in axial section of yet another modification of a mounting.

The embodiment described with reference to FIG. 7 is still simpler, since it does not comprise more than 2 armatures 2 and 3 each constituted by a simple folded sheet metal and mounted in cantilever arrangement, without fastening to the central portion of the plates 1. The ends of these plates are embedded in elastomer blocks 4 gripped in corresponding internal rabbets 12 and 13 of these armatures. The compression 9 and traction 8 buffers can be arranged in different ways, for example, in an external rebate 3' of the armature 3, by being bonded on both sides of a backward-bent lip 14 of the armature 2. As for the bolts 2" and 3", they have the same role as in the preceding embodiment. It is to be noted that the plates 1 may be placed in pre-stressed condition, to compensate the static load of the engine.

Figure 8:
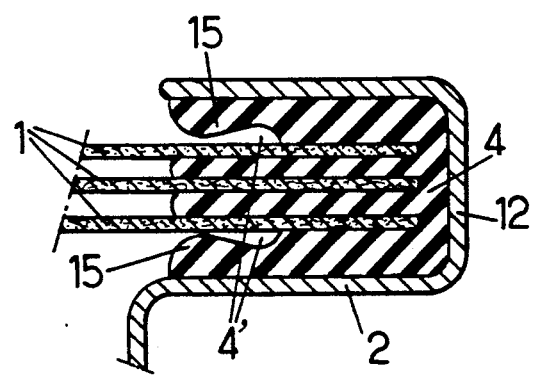
FIG. 8 shows in partial section a detail of the embedding feature.

In FIG. 8, lastly, there is shown an advantageous detail of the embedding feature, which can be employed in all the above described embodiments: voids 4' are formed between the plates 1 and the elastomer blocks 4; this elastomer is extended up to the edge of the enveloping sheet metal 2, thus forming a heel 15 which is separated from an adjacent plate 1 when the elastic mount is in a rest position.

For an idling state of the engine, the mount does not undergo any load outside of the static load of the engine; the stiffness is low, in the same way as the transmission of vibration and noise. Under torque, the plates 1 become supported on one or other of the heels 15, their free length diminishes and their stiffness increases; there is hence obtained at the same time the advantage of a low stiffness on idling and an increased stiffness under torque, which then enables the displacements to be limited, with preservation of a notable play between the buffers.

Figure 9:
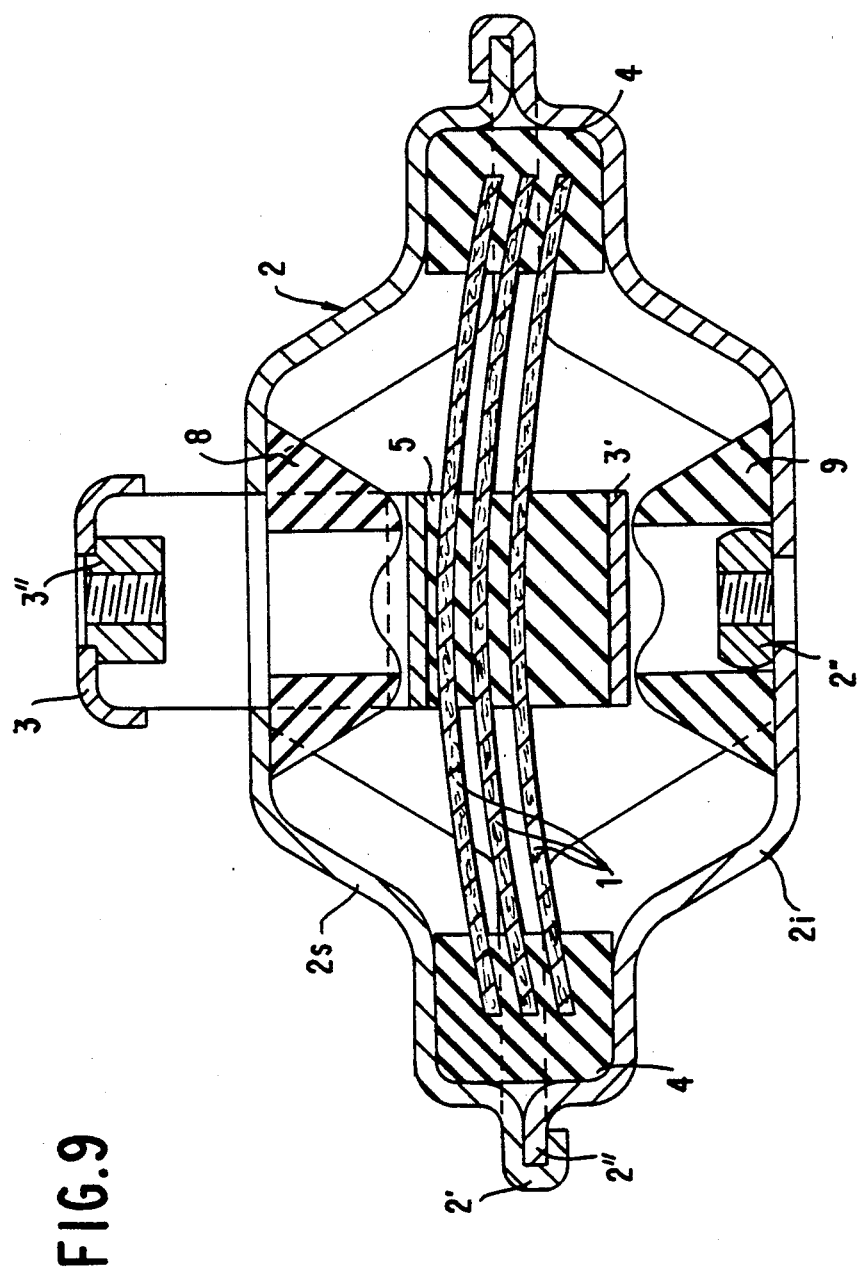
FIG. 9 is an axial sectional view of another embodiment of an elastic mounting system according to the invention.

FIG. 9 illustrates an alternative embodiment in which the plates 1 are domed and each have an apex in the middle of elastomer block 5.

I claim:

1. An elastic mounting apparatus for a vehicle engine comprising:
    a first armature for fixing to a structure of a vehicle;
    a second armature for fixing to and supporting an engine;
    an elastic system located between said two armatures, said elastic system having relatively weak rigidity in a vertical direction z and having higher rigidities in two transverse directions x and y, said x, y and z directions comprising an orthonormal system, said elastic system comprising a set of thin parallel and spaced plates of flexible material extending substantially transversely to said vertical direction z, said plates being uninterrupted and comprising a composite material, each of said plates including two ends and first superposed blocks of elastic material intercalated as a sandwich between corresponding ends of said plates whereby said ends are fastened to one of said armatures, said first blocks flexibly fastening both ends of each of said plates to said one armature, said plates including middle parts and second superposed blocks of elastic material intercalated as a sandwich between said plates whereby said middle parts are fastened to the other of said armatures.

2. An elastic mounting apparatus according to claim 1, further comprising a compression buffer for limiting vertical movements of the engine downwards and a traction buffer for limiting vertical movements of the engine upwards, each of said buffers comprising at least one block of elastomer.

3. An elastic mounting apparatus according to claim 2, wherein said traction buffer is fastened to an anchoring part for the engine fastened to one of said armatures, said buffer being arranged so as to be stopped by the other of said armatures during displacement of the engine upwards to limit an amplitude thereof.

4. An elastic mounting apparatus according to claim 2, wherein said traction buffer is mounted on an enveloping rim of the plates and rigidifies a structure fast to one of said armatures.

5. An elastic mounting apparatus according to claim 2, wherein said compression buffer is borne by one of said armatures to serve as stop for the other of said armatures during displacements of the engine downwards to limit an amplitude thereof.

6. An elastic mounting apparatus according to claim 2, wherein said at least one block of elastomer comprises a shock absorbing material.

7. An elastic mounting apparatus according to claim 1, wherein one of said armatures comprises two half shells of folded sheet metal crimped to one another at edges thereof, said blocks of elastic material being gripped between said two half shells at the ends of the plates, and wherein the other of said armatures comprises two half shells of folded sheet metal crimped to one another at edges thereof, said other of said armatures skirting said armatures and including said second superposed blocks of elastic material.

8. An elastic mounting apparatus according to claim 1, wherein said first and second superposed blocks include voids close to the ends of the corresponding plates, said voids defining heels which are spaced from an adjacent plate when said elastic mounting apparatus is in a rest position.

9. An elastic mounting apparatus according to claim 1, wherein said plates are slightly domed to compensate for a static load.

* * * * *